United States Patent [19]

Gupta

[11] 3,928,647
[45] Dec. 23, 1975

[54] DRY PREPARED MUFFIN MIXES COMPRISING IMPACT-MILLED HARD WHEAT FLOUR

[75] Inventor: Monoj Kumar Gupta, Somerset, N.J.

[73] Assignee: The Procter & Gamble Company, Cincinnati, Ohio

[22] Filed: Apr. 23, 1973

[21] Appl. No.: 354,029

[52] U.S. Cl. ............................................. 426/554
[51] Int. Cl.² ........................................ A21D 10/00
[58] Field of Search ........... 426/156, 152, 343, 153, 426/148, 375, 554

[56] References Cited

UNITED STATES PATENTS

| | | | |
|---|---|---|---|
| 2,555,902 | 6/1951 | Salo et al. | 426/343 |
| 3,508,928 | 4/1970 | Ewing et al. | 426/343 |
| 3,671,264 | 6/1972 | Drews et al. | 426/152 X |

*Primary Examiner*—Raymond N. Jones
*Attorney, Agent, or Firm*—Louis G. Xiarhos; James A. Arno

[57] ABSTRACT

Dry, prepared muffin mixes are prepared comprising impact-milled hard wheat flour; such mixes provide muffins of superior texture and volume.

4 Claims, No Drawings

DRY PREPARED MUFFIN MIXES COMPRISING IMPACT-MILLED HARD WHEAT FLOUR

BACKGROUND OF THE INVENTION

This invention relates to dry, prepared muffin mixes which comprise impact-milled hard wheat flour. Muffins prepared from such mixes are characterized by superior texture and enhanced volume over conventionally prepared muffins.

Muffins are to be distinguished from cakes and breads. Bread doughs, with rare exception, are subjected to intensive mixing and kneading prior to baking; the leavening agent is typically yeast and high gluten flours are preferred. Cake batters are subjected to intensive mixing, preferably by high speed electric mixers to incorporate air and to achieve a smooth texture of the batter prior to baking; chemical leavening agents are the most common and preferred. Also, cakes are made almost exclusively from soft wheat flours. In making muffins, however, mixing is held to an absolute minimum, a light stirring of from 10 to 20 seconds. The batter should not be mixed to the point of pouring, ribbon-like, from the spoon but should break into coarse globs. Muffins are, of course, usually baked in individual round, straight-sided tins; chemical leavening agents are used exclusively. According to individual preferance muffins may be made from either soft wheat cake flour, hard wheat flour, or all-purpose flour which may be a blend of soft and hard wheat flours. Other materials such as rice flour, wheat bran, whole grain wheat flours, and corn meal are popular.

A good muffin should have a texture which is not fine but uniformly robust and slightly coarse with a moist crumb. A good muffin should have a fully developed rounded top evidencing light density. However, the instructions for muffin preparation are deceptively easy, for all too frequently the muffin's texture will be characterized by tough coarseness great tunnels and cavities throughout the corpus of the muffin. Frequently the muffins will be of low volume (high density) despite a theoretically adequate amount of chemical leavening agent.

Thus, an object of this invention is to provide dry, prepared muffin mixes which essentially make foolproof the obtainment of muffins of superior texture and enhanced volume.

SUMMARY OF THE INVENTION

Unexpectedly it has been discovered that dry prepared muffin mixes comprising, in addition to conventional leavening agents, shortening, flavorants, texturizing agents such as wheat bran, corn meal, and fruit/nut pieces, a flour component which is at least about 80 wt. % impact-milled hard wheat flour provide, after batter preparation and baking, muffins of superior texture and enhanced volume.

DETAILED DESCRIPTION OF THE INVENTION

The preferred basic flour component of the dry, prepared muffin mixes of this invention is selected from the various commercially available hard wheat flours. Hard wheat flours are to be distinguished from soft wheat flours which are primarily useful in the manufacture of cakes and other baked culinary products which rely on chemical leavening. The differences between hard and soft wheat flours are primarily attributable to their respective protein contents (protein properties) and protein distribution within the endosperm of the wheat kernel. Such protein serves largely as a binding and structural matrix for the starch granules of the endosperm. Hard wheats have a much higher protein content than soft wheats; and it is this protein involvement at the starch granule interface within the endosperm which make milling of hard wheat flours distinct from the milling of soft wheat flours. Hard and soft wheat flours are markedly different in functional properties, such as water absorptivity. Hard wheat flours (due largely to their higher protein content) absorb much more baking water than soft wheat flours, thus limiting their usefulness in chemically leavened baked goods.

Milling of soft wheat flours may be further characterized. In contrast to the hard wheats, in the soft wheats, the proteinaceous binding material has little strength and forms a poor union with the starch granules. Accordingly, when a soft wheat endosperm particle is subjected to shearing pressure the cells readily disintegrate releasing free but undamaged starch granules. Soft wheat flours, on microscopic examination, do not reveal the original cell structure of the endosperm. The resulting flour consists largely of free protein particles and free starch granules. The starch granules have been subjected only to slight strain and little abrasive action and therefore are not injured.

Milling of hard wheat may be further characterized. When hard wheat endosperm particles are subjected to shearing pressure as in conventional milling, the individual cells tend to break up along the cell wall boundries. However, in milling practically all of the cells are damaged to some extent; the starch granules on the cleavage surface of the crushed pieces receive severe damage. Also the granules on all surfaces of the cells are given severe abrasive treatment as they go through the rolls and are crushed against other particles. In fact, the protein-starch union is so tenacious in this type of endosperm particle that relatively few free starch granules are released even when the cell is crushed. Cells and fragments of cells constitute the greater share of flour made from hard wheats. In further explanation of the milling differences between hard and soft wheat flours see *Baking Science and Technology*, Vol. 1, E. J. Pyler, Siebel Publishing Company, Chicago Ill., (1952); *Supplement to Cereal Chemistry*, Vol. 32, No. 3, May 1955, pages 16 to 47; and *Cereal Science Today*, June 1967, page 245.

Representative of the principal hard wheat flours useful as a first basic ingredient in the ultimate preparation of dry, prepared muffin mixes of this invention are: hard red spring wheats, such as dark northern spring, northern spring, and red spring; durum wheats, such as hard durum, amber durum and durum; red durum wheats; hard red winter wheats, such as dark hard winter, hard winter, and yellow hard winter; and white wheats such as hard white.

Milled flours obtained from such wheats are readily commercially available in different flour patent grades such as first patent flour, short patent flour, medium patent flour, standard patent flours, and the like. But for purposes of practice of this invention, there exists no criticality as to the particular patent grade of the hard wheat flour. It is critical, however, that the hard wheat flour be intensively milled prior to formulation of the dry prepared muffin mixes of this invention. Hard wheat flour, so milled, is referred to herein as "impact-milled hard wheat flour". Further, of the total flour component of the muffin mixes of this invention, at least about 80 wt. % should be "impact-milled hard wheat flour", or its equivalent as explained below.

Unexpectedly it has been discovered that when impact-milled hard wheat flour is used in the preparation of muffins, the resulting muffins exhibit superior texture and enhanced volume without sacrifice of the slightly robust coarseness which good muffins are expected to possess. No entirely satisfactory reason can be set forward as to why the dry, prepared muffin mixes of this invention provide such unexpected results, but it is believed that in some way the intensive milling frees the starch granules from the binding protein matrix optimizes starch granule water absorptivity for the specific enhancement of muffin texture and volume.

Thus, the essence of the present invention involves critical, intensive milling of hard wheat flour; impact-milling is preferred. This milling is separate from any treatment which subsequently effects blending of all ingredients. That is, impact-milling of the hard wheat component is distinct from the final step wherein the impact-milled hard wheat is blended with the other components to form the dry, prepared muffin mixes of this invention. Such component ingredients include sugar, flavorants, fruit and nut pieces, corn meal, bran, and an oleageneous component.

While impact-milling of the hard wheat flour with an impact-mill is preferred, other mills such as roll mills, disc pulverizers, ball mills and air jet mills can be employed; however, milling on such non-impact mills constitutes a less preferred embodiment of the present invention. All of these milling devices can generally be classified into four groups:

1. Mills which employ crushing and shearing forces between two hard surfaces. Examples are roll mills and ball mills.
2. Mills which employ screen, grid, or grating through which the material to be ground is forced. Most hammermills are exemplary of this type of mill.
3. Mills which employ a suspension of the material to be ground in a liquid such as water or oil. Examples are "attritors" and some types of roller mills.
4. Impact-mills wherein the material to be ground is reduced in size by striking a hard surface which can be a rotating member of the device, a stationary member of the device, other particle of the material being treated and/or mixtures of these three types of "impacts." Impact mills can further be classified into two sub-types as follows:
   a. "One-pass" impact mills where there is no internal provision for recirculating oversize material or grinding it in several internal stages, and where there is little or no co-action between the particles being treated;
   b. Multi-pass impact mills which employ an internal particle size classifier to return oversized material for further grinding, or which subject the material to be treated to repeated grinding actions in several internal stages. These multi-impact mills involve a substantial co-action between particles of the material being treated.

Of all the above-described grinding devices, the impact mills defined under 4a and 4b are the most preferred for milling hard wheat flour in accordance with the present invention.

The conventional one-pass impact grinding devices, examples of which are described in U.S. Pat. Nos. 2,339,737 and 2,651,470, are often referred to as "entoleters". Such devices generally comprise two parallel horizontal discs spaced apart by interconnecting pins or blades arranged in one or two cylindrical planes extending at right angles to the surface of the discs. An external shell encloses the discs. Material to be treated is passed through a hole in the center of the top disc while the discs are revolving at a high rate of speed. Centrifugal force impacts the material against the pins and hence against the external shell, thereby breaking up large particles. The broken up material is passed out through an outlet at the bottom of the device. These machines are very useful for limited size reduction of particles and/or for breaking up agglomerates. However as a particle progresses from the inlet or the center of the machine to the periphery of the machine, there is essentially only one or two impacts (as the particle passes through the plane of the pin) and perhaps one additional impact (as the particle strikes the external shell). Thus, the amount of size reduction that can be accomplished in such a one-pass mill is limited.

On the other hand, the multi-impact mills, e.g., type 4b mills, above, which are particularly useful for the present invention involve multiple impacts for any given particle and also involve co-action between particles. Air or a similar gas is used to suspend and transport the particles being treated within the mill.

In one specific type of useful multi-impact mill, the multiple-impact effect is achieved by utilizing an impact zone and a classifying zone. Fine or properly-sized particles are discharged from the classifying zone and coarse or oversized particles are recycled to the impact zone. This type of mill can, therefore, be termed a multi-pass impact mill. Examples of useful multi-pass impact mills are described in the following references: U.S. Pat. No. 3,184,172; U.S. Pat. No. 3,082,962; "Bulletin 094", published by the Sturtevant Mill Co., Boston, Mass.; "Bulletin 6405", published by the American Manufacturing Co., New Haven, Conn.; "Bulletin G-4-C" published by the Bauer Bros. Co., Springfield, Ohio; and "Bulletin ACM-1", published by the Slick Industrial Co., Summit, New Jersey. The mutli-pass impact mills disclosed in the above-cited references all involve high speed impact of particles with hard surfaces in an impact zone and internal classification wherein oversized particles are returned to the impact zone in such a manner that co-action between particles is achieved. Thus, milling in a multi-pass mill comprises size-reducing flour in an impact zone and re-cycling oversized particles to the impact zone whereby particles impact with each other.

A specifically preferred multi-pass impact mill is known as a vertical air-swept impact mill. In this mill flour is fed to the bottom of a cylindrical-shape housing containing a vertical rotating shaft. Vanes on the shaft create a whirling vertical air flow and revolving impactors on the shaft crush the flour particles against the housing walls as air flow causes the particles to pass upward through the impact zone. Above the impact zone, an exhaust fan pulls fines upward through revolving centrifugal selector arms while deflector walls cause large particles to return downward to the impact zone where they co-act with the upward flowing input particles.

In another type of useful multi-pass impact mill, the impact of one particle against another is utilized to accomplish essentially all of the required size reduction and co-action; the mill per se serves mainly to contain, direct and control high velocity air streams which transport the particles. Such mills are sometimes referred to as "jet mills". Examples of useful jet mills are described in "Bulletin M-463," published by Majac, Inc. Pittsburgh, Pa. and in a pamphlet entitled "Jet Mills For Your Products" published by Fluid Energy Processing and Equipment Co., Lansdale, Pa.

In a second specific type of multi-impact mill, multiple impact effect is achieved by utilizing an impact zone comprised of successive stages. For example, the particles can be passed on a torturous path through rows of intermeshing (but not touching) studs or pins provided on a stationary and a rotatable disc or the material can be pressed through a series of propeller type projections attached to a single shaft rotating at high speed. This type of impact mill can thus be termed a multi-stage impact mill (pin mill) and is preferable for use in this invention. Such mills inherently involve internal recycling and co-action of particles in the impact zone due to the difficulty experienced by the particles in passing from one stage to the next. Examples of useful multi-stage impact mills are disclosed in U.S. Pat. No. 2,752,097, 2875,956, and 3,067,959. Thus, milling in a multi-stage impact mill comprises size reducing flour (for purposes of the present invention hard wheat flour) in an impact zone of successive stages whereby particles impact with each other.

A preferred multi-stage impact mill for use in the present invention is known as a sieveless impact stud mill and is described in a pamphlet entitled "Kolloplex," published by Alpine Aktiengsellschaft, Augsburg, Germany. This mill utilizes two coaxially-mounted discs having an array of studs in circumferential rows projecting therefrom and interspaced between the two discs. One disc is stationary while the other rotates at high speeds, e.g. 5,000–15,000 r.p.m.'s The particles to be treated are released into the center of the discs and are forced to the perihery thereof by centrifugal force. Size reduction and coaction is achieved by the interaction of particles with each other and with the studs as the material passes on its tortuous path through the rows of interspaced studs provided on the stationary and the rotatable disc. Each row of studs represents a stage. A similar sieveless impact stud mill and also a preferred multi-stage impact mill for use herein is disclosed in U.S. Pat. No. 2,712,416, and in a pamphlet entitled "Contraplex" published by Alpine Aktiegesellschaft, Augsburg, Germany. In this particular mill, both of the discs revolve, preferably at different speeds or in different directions to each other.

Preferably, sieveless impact stud mills of the type described above have the following characteristics:

Diameter of disc, 4 inches to 40 inches; diameter of studs, 0.1 inch to 0.4 inch; length of studs, 0.5 inch to 2.0 inches; number of studs per disc, 30 to 300 rows, row of studs per disc, 2 to 10; speed of rotating discs, 1,000 rpm to 18,000 rpm; speed of second rotating disc (if so equipped) 500 rpm to 10,000 rpm.

Thus, having described the preferred impact milling devices for milling the hard wheat flours of this invention it is necessary to set the parameters necessary to obtain impact-mill hard wheat flours which impart the above-described superior texture and enhanced volume to muffins made therefrom.

As stated above, what really takes place when a hard wheat flour is impact milled and how this affects muffin quality has not been satisfactorily expalined. The difficulty is that many different things take place when hard wheat flour is impact milled. Reduction in size of flour particles may be the most important change which occurs during impact milling. But damage to flour components other than starch may also be important. The changes due to impact milling affect the way flour hydrates, which in turn affects the viscosity and possibly the colloidal properties of batter, as well as the quality of the baked muffin.

The hard wheat flours which are impact milled according to this invention are commercially obtainable in ordinary patent form. Thus, prior to the milling operation, the flour particles generally have particle diameters ranging from about 1 to about 175 micrometers and a mean particle diameter within the range of from about 30 to about 65 micrometers. One of the characterizing effects of the milling operation is to cause a size reduction of the flour particles. Hence, after the impact milling operation the hard wheat flour particles have a size distribution ranging from about 1 to about 175 micrometers with a mean particle diameter (comprising 50% of the total particles) of from about 20 to about 40 micrometers.

Although depedent upon such variables as the size and type of the impact mill used, a desirable flow rate through the mill is within the range of from about 5 pounds to about 200 pounds, preferably from about 10 pounds to about 150 pounds of material being processed per hour/per horsepower of the mill. The power of the mill can in turn range from about 1 to about 125; preferably from about 10 to about 75 horsepower.

The total work input is also governed to some extent by the specific mill and conditions employed. However, a total work input to the mill within the range from about 3 to about 7 watt-hours per pound of material has been generally found to be desirable. Preferably the total work input to the mill should be within the range of from about 4 to about 6 watt-hours per pound.

Once obtained the impact milled hard wheat flour is blended with the other ingredients to prepare the dry, prepared muffin mixes of this invention. This final blending can be accomplished by a variety of means. These so-called "dry" prepared mixes used for baking are made by combining sugar, flour, shortening and other ingredients including leavening, milk solids, egg solids, flavoring and coloring to form a smooth free-flowing granular mixture. It is known that the method by which the various ingredients in such culinary mixes are combined can affect the properties of the cake, muffin, or other end product. For example, in the processing of a leading brand of commercially available layer cake, homogeneous blend of sugar, flour and shortening is subjected to simultaneous shearing and crushing forces by passing said blend through a roll mill prior to the addition of the minor ingredients. This roll milling operation which is described in detail in U.S. Pat. Nos. 2,874,051, 2,874,052, and 2,874,053 imparts superior properties to the products prepared from mixes processed in this manner. For example, culinary products such as cakes prepared from mixes processed by the roll-milling technique described in the aforesaid patents are generally considered to be superior to cakes prepared from mixes processed by conventional methods in areas such as ease of preparation, volume, grain, general appearance, structure and eating quality. The conventional techniques referred to above generally involve simply mixing the ingredients in a paddle mixer or ribbon blender followed by hammermilling or mild impact grinding to eliminate lumps and to form the desired granular mixture. These conventional blending procedures are entirely suitable for preparation of the dry prepared muffin mixes of this invention, but it is to be emphasized that the prior impact milling of the hard wheat flour is a distinct and critical step which must be followed to achieve the enhanced texture and enhanced volume of muffins made therefrom.

Preferably, in this final blending step, the shortening and sugar are first blended, then the impact milled hard wheat flour component is blended with the sugar-shortening mixture in a paddle mixer, a ribbon blender, or a high speed rotary mixer to form an essentially homogeneous flour-shortening-sugar blend; finally the additional ingredients are admixed (also in any conventional mixer) with this blend.

The dry, prepared muffin mixes of this invention with the exception of the impact milled hard wheat flour generally comprise otherwise conventional components. These components include, as mentioned above, shortening, sugar, and a leavening agent. Additional ingredients such as milk solids, flavoring, fruit and nut bits are added in varying amounts to provide the specific type of product desired, e.g., blueberry muffins.

As described in length above, the flour component of the dry, prepared muffin mixes of this invention is substantially impact milled hard wheat flour. By "substantially" is meant a flour composition comprising at least about 80 wt.% impact milled hard wheat flour; other flours such as soft and non-impact-milled hard wheat flours, for example, comprising the balanace.

Suitable sugars include any of the commonly used granular sugars such as sucrose, dextrose, maltose, fructose, lactose, brown and invert sugars.

The shortenings which can be employed in the muffin mixes of this invention include solid or plastic as well as liquid or semi-fluid glyceride shortenings derived from animal, vegetable, or marine fats and oils including synthetically prepared shortenings. These glycerides can contain saturated or unsaturated long chain acyl radicals having from about 12 to about 22 carbon atoms such as lauroyl, lauroyleoyl, myristoyl, myristoleoyl, palmitoyl, palmitoleoyl, stearoyl, oleoyl, linoleoyl, linolenoyl, arachidoyl, arachidonoyl, behenoyl, erucoyl, and the like and are generally obtained from edible oils and fats such as cottonseed oils, soybean oil, coconut oil, rapeseed oil, peanut oil, olive oil, palm oil, palm kernel oils, sunflower seed oil, wallflower oil, menhaden, herring, whale, pilchard oil, lard, tallow and the like. These glycerides can also contain in part one or two short chain acyl groups having from about 2 to about 6 cargon atoms such as acetyl, propanoyl, butanoyl, valeryl, and caproyl; they can be prepared by random or low temperature interesterification reactions of fatty triglyceride-containing oils and fats such as interesterified or rearranged cottonseed oil and lard; and they can be otherwise formed by various organic syntheses.

The shortening can be of the so-called emulsified variety, containing up to 50%, and more normally about 5 to about 25% by weight of one or more suitable emulsifiers. The partially esterified polyhydric components having surface active properties are examples of appropriate emulsifiers. This class of emulsifiers includes among others mono- and diglycerides of fatty acids such as monostearin, monopalmitin or rapeseed monoglyceride; partial patty acid esters of glycols, such as propylene glycol monostearate and monobehenate; higher fatty acid esters of sugars, such as the partial palmitic and oleic esters of sucrose, and phosphoric and sulphuric acid esters such as dodecyl glyceryl ether sulphate and monstearin phosphate. Other examples are the partial esters of hydroxycarboxylic acids such as lactic, citric and tartaric acids with polyhydric compounds, for example, glyceryl lactopalmitate, and the polyoxyethylene ethers of fatty esters of polyhydric alcohols, such as polyoxyethylene ether of sorbitan, monostearate or distearate. Fatty acids alone or esterified with a hydroxy carboxylic acid, e.g. stearyl-2-lactylate, are also useful.

Preferably, the emulsifier, if employed, is any one or a combination of the various alpha phase crystal-tending emulsifiers disclosed in U.S. Pat. No. 3,145,108, and 3,145,109 issued to Howard on Aug. 18, 1964, and in the U.S. Pat. No. 3,145,110 issued to Abbott on Aug. 18, 1964. Examples of such alpha phase crystal-tending emulsifiers are propylene glycol monostearate, acytelated mono- or diglycerides and lactylated mono- or diglycerides.

The selection of a chemical leavening system from among those known in the art poses no problem for one skilled in the formation of culinary mixes. In general such systems are composed of baking soda, e.g., sodium, potassium or ammonium bicarbonate, on the other hand, and one or more phosphates or other common backing acids on the other. Suitable baking acids include monocalcium phosphate, dicalcium phosphate, sodium acid pyrophosphate, potassium acid tartrate, monosodium phosphate, sodium aluminum phosphate, and sodium aluminum sulphate, among others. The amount of soda and the selected acids are so balanced as to achieve a pH in the resultant muffin batter of from about 6 to about 10. Frequently, provision of a slight excess of soda is advantageous so as to assure absence of unreacted acid or to compensate for the acid tendency of some batter ingredients.

For many mixes it is acceptable for the consumer to add eggs in the course of batter preparation and this practice can be followed just as well in the present mixes. If desired, the inclusion of egg solids in the mix is an allowable alternative. The function and permissible variations in the remaining ingredients, for example, flavor, color, fruit particles, such as blueberries and nut meats, hydrophillic colloids, dry milk solids, or the like are sufficiently apparent to render the detailed explanation thereof unnecessary.

In general the composition of the dry, prepared muffin mixes of the present invention may be represented by the following composition ranges:

| Ingredient | Percent by Weight of Dry Mix |
|---|---|
| Total flour component | 40–60 |
| Shortening | 8–14 |
| Sugar | 25–40 |
| Leavening agents | 1–3 |
| Egg solids, milk solids, flavorants, nut and fruit pieces, corn meal, wheat bran and the like comprising the balance. | |

The following specific examples will further illustrate the product invention.

EXAMPLE I

Composition

| Ingredients | Parts by Weight |
| --- | --- |
| Impact-milled hard wheat flour | 40.30 |
| Sucrose | 33.05 |
| Shortening [1] | 12.0 |
| Dextrose | 1.0 |
| Nonfat milk solids | 2.50 |
| Soda | 1.0 |
| Leavening acid | 1.0 |
| Salt | 1.0 |
| Canned blueberries (drained) | 3.5 |
| Flavoring ingredients | less than 0.1 |

[1] 94.5 wt.% partially hydrogenated vegetable fat (I.V., 70–115) and 5.5 wt.% fully hydrogenated vegetable fat (I.V. 1–10).

The impact milled hard wheat flour was obtained by milling 100 pounds of hard wheat flour (Hard Red Winter) by passing it through an Alpine Kolloplex 160Z impact mill operated at 11,000 r.p.m. The hard wheat flour particles had a size ranging from about 1 to about 175 micrometers and a mean particle diameter of about 30–65 micrometers. The resulting impact-milled hard wheat flour from the multi-impact mill comprised flour particles having a size range of from about 1 to about 150 micrometers and a mean particle diameter range of from about 20 to about 32 micrometers. The flow rate of flour through the mill was about 140 pounds/hour and the total work input to the mill was about 5 watt-hours/pound of material processed.

A creamy blend of 360 grams of the shortening and 991 grams of sugar was mixed with 1451 grams of the impact-milled hard wheat four in a paddle mixer until a homogeneous blend was formed. The proper amounts of the additional ingredients (except the blueberries) were then added to the homogeneous blend by further mixing in a paddle mixer. The mixture thus formed was mildly impact milled in an Entoleter to form a smooth free-flowing dry mix.

Batter was prepared by adding ½ cup of water, one whole egg, and the blueberries to 284 grams of the above-described mix. After briefly mixing with a spoon for about 30 seconds, individual muffin tins were spoon loaded with the muffin batter. Each tin had a level volume of 30 cm³ and each tin received about 40 grams of the muffin batter. The muffins were baked in an oven at 400°F for about 16–18 minutes. The resulting muffins were compared against muffins which had been prepared exactly as described except that instead of the impact milled hard wheat flour there was substituted ordinary patent hard wheat flour which had not been impact milled. On comparing the two types of muffins it was found that the muffins prepared from the mix of this invention had a maximum mean height of about 1.53 inches whereas those prepared with the non-impact milled hard wheat flour had a maximum mean height of 1.4 inches. This corresponds to about a 30% volume enhancement over the control. Also the product of the present invention exhibited superior, more uniform texture than the control.

In the above example, substantially equivalent results are observed in the processing of high volume muffin mixes suitable for the preparation of muffins of robust but uniform texture when the Alpine 160Z impact stud mill of the example is replaced with the multi-impact mills described in U.S. Pat. Nos. 3,082,962 and 3,184,172; a jet mill; or the multistage impact mills disclosed in U.S. Pat. Nos. 2,752,097, 2,875,956, and 3.067,959, respectively.

As in the above example, substantially equivalent results are obtained when the impact-milled hard wheat flour component is replaced by a flour comprising 80 wt.% impact-milled hard wheat flour and either 20 wt.% non-impact-milled hard wheat flour, 20 wt.% soft wheat flour, or 15 wt.% non-impact-milled hard wheat flour and 5 wt.% corn meal, respectively.

From the foregoing examples it can clearly be seen that by the practice of this invention a dry muffin mix is produced which can be used to make muffins having an enhanced height and volume with superior texture over conventionally prepared muffins, wherein said conventionally prepared muffin mixes are distinguishable only in that they are not constituted substantially from impact-milled hard wheat flour.

What is claimed is:

1. A pulverulent and free-flowing dry muffin mix suitable for the preparation of muffins, said mix comprising flour; chemical leavening agent; sugar; and shortening; said flour comprising at least about 80% by weight of impact-milled hard wheat flour.

2. A muffin mix according to claim 1 wherein all of said flour is impact-milled hard wheat flour.

3. A muffin mix according to claim 1 wherein the balance of said flour component comprises conventionally, non-impact milled flour.

4. A muffin mix according to claim 1 comprising by weight of the dry mix from 40% to 60% flour; from 1% to 3% chemical leavening agent; from 25% to 40% sugar; and from 8% to 14% shortening.

* * * * *